United States Patent Office 3,784,532
Patented Jan. 8, 1974

3,784,532
BULK POLYMERIZATION PROCESS MODIFIED WITH SOLVENT TO REDUCE RESIDUAL MONOMER CONTENT
Robert P. Fellmann, Wrightstown, and Jong Jai Whang, Southampton, Pa., assignors to Rohm and Haas Company, Philadelphia, Pa.
No Drawing. Continuation-in-part of application Ser. No. 709,785, Mar. 1, 1968. This application Sept. 18, 1970, Ser. No. 73,628
Int. Cl. C08f 3/64, 3/66, 15/18
U.S. Cl. 260—86.1 E          5 Claims

ABSTRACT OF THE DISCLOSURE

The polymerization of a monomer system is improved by the presence of 1 to 30 percent by weight based on the total weight of the system of a non-polymerizable, chemically inert, volatile solvent. The system is characterized as one which: (1) if bulk polymerized would produce a polymer product which would degrade or depolymerize upon application of conditions necessary to remove residual monomer by volatilization and which product would contain amounts of residual monomer sufficient to affect its physical properties; (2) if bulk polymerized would be limited in reaction rate by the difficulty of diffusion of monomer to reactive sites, and/or (3) if bulk polymerized would produce a polymer product which would limit reaction rate of further polymerization by inhibiting diffusion of monomer to reactive sites.

---

This application is a continuation-in-part of Fellmann et al., U.S. patent application 709,785, filed Mar. 1, 1968, now abandoned.

"Bulk polymerization is the direct conversion of liquid monomer to polymer in a reaction system in which the polymer remains soluble in its own monomer." (Kirk-Othmer, Encyclopedia of Chemical Technology, 2nd ed., vol. 16, p. 238). In the bulk polymerization of certain monomer systems various problems are encountered. After substantial completion of the polymerization, an amount of unpolymerized or unreacted monomer may remain with the polymer product. In many systems, this residual monomer may be of such a nature or may be so small in amount, that properties of the polymer product are little affected by its presence. However, in other systems the amount and/or the nature of the monomer may be such that the properties of the product are substantially adversely affected. In such systems, it would be advantageous to remove the monomer from the product. Commonly this is accomplished by the application of elevated temperature under vacuum. For example, residual monomer may be removed from some polymeric products during extrusion of the product. With this means of removal, the monomer must be such that it may be removed from the polymer by the application of conventional vacuum devolatilization techniques and must be of a boiling point such that it will volatilize under conditions at which the polymeric product will not depolymerize or otherwise degrade. The homopolymer products of styrene or methyl methacrylate or the copolymer product of styrene and methyl methacrylate are examples of system from which residual monomer may be easily removed by volatilization.

The rates of polymerization of monomers or mixtures of monomers affect the amount of residual monomer remaining with the final polymer. Some monomer systems are slow to either homopolymerize or copolymerize with other monomers, resulting in large quantities of unreacted monomer with the polymeric product. In this type of system the polymerization rate is the major cause of the relatively large quantity of residual monomer remaining after the application of heat and catalyst. In some systems, the polymerization rate or the copolymerization rate would apparently allow for essentially complete conversion however the polymer product is of such a nature that it inhibits diffusion of monomer to reactive sites and substantial amounts of unreacted monomer are left with the product.

The present invention is an improvement of the polymerization of a monomer system which is characterized as one which: (1) if bulk polymerized would produce a polymeric product which would degrade or depolymerize upon application of conditions necessary to remove residual monomer by volatization and which product would contain amounts of residual monomer sufficient to affect the physical properties thereof; (2) if bulk polymerized would be limited in reaction rate by the difficulty of diffusion monomer to reactive sites, and/or (3) if bulk polymerize dwould produce a polymer product which would limit reaction rate of further polymerization by inhibiting diffusion of monomer to reactive sites, i.e., the diffusion of reactive monomer is restricted by the character of the polymer.

The present invention is an improvement to a process for polymerizing monomer systems characterized as above in which the polymerization is carried out in the presence of up to 30 weight percent based on the total weight of the system of a non-polymerizable, chemically inert, volatile solvent. The volatile solvent is then removed preferably by volatilization and a polymer product is recovered characterized by substantially reduced monomer content and improved physical properties as compared to a polymer product produced by bulk polymerization of the monomer system in the absence of the solvent. By "chemically inert" is meant substantially chemically unreactive in the particular polymerization medium under the conditions of polymerization.

The process of the present invention is particularly applicable to the polymerization of certain esters and amides of acrylic and methacrylic acid such as those disclosed in Hurwitz and Cenci, U.S. Pat. 3,485,775, issued Dec. 23, 1969 and Hurwitz and Cenci, U.S. Pat. 3,536,788, issued Oct. 27, 1970. The polymeric products disclosed in these patents are particularly valuable and useful as processing aids and heat distortion temperature improvers for poly(vinyl chloride).

Suitable monomers making up systems in which the present invention is applicable include phenyl, substituted phenyl, cyclohexyl, and substituted cyclohexyl amides of methacrylic and acrylic acid. The monomers also include the bicyclic esters of acrylic and methacrylic acid which may be described most easily by the following structural formula:

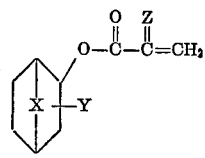

where X is —$CH_2$—, —$CH(CH_3)$—, or —$C(CH_3)_2$—, Y is selected from the group consisting of a hydrogen atom, a halogen atom and a methyl group or a plurality thereof which may be bonded to any carbon atom of the six membered ring, and Z is selected from the group of a hydrogen atom and a methyl group. This structure will include but is not limited to fenchyl methacrylate and acrylate, isofenchyl methacrylate and acrylate, bornyl methacrylate and acrylate, isobornyl methacrylate and acrylate and norbornyl methacrylate and acrylate. Subsequent references to "the high boiling monomers" will refer to these monomers or mixtures of them.

It will be obvious to one skilled in the art that the characteristics outlined earlier of the polymers to which this invention is directed may contain less than major amounts of these high boiling monomers but still contain substantial amounts of the residual high boiling monomer. Therefore, the monomers described above may be included in copolymers with monomers or mixtures of monomers which alone would not cause the difficulty of residual monomer herein described. The presence of the higher boiling monomers causes the copolymer to take on the characteristics of the polymer described above such that the technique of this invention is necessary. This effect on the polymer is not substantial until at least 10% of the high boiling monomer is present. Examples of monomers whose characteristics might be dominated by the monomers described above may include but should not be limited to methyl methacrylate, methyl acrylate, ethyl methacrylate, ethyl acrylate, 2-ethylhexyl methacrylate, 2-ethylhexyl acrylate, isopropyl methacrylate, butyl acrylate, styrene, alphamethylstyrene, vinyl toluene, other alkyl substituted styrenes, monochlorostyrene, dichlorostyrene, other halo-substituted styrenes, acrylonitrile, vinyl acetate, methacrylonitrile, haloacrylonitriles, methacrylamide, maleic anhydride, etc. This invention also relates to mixtures of these lower boiling monomers, copolymerized with either one of the high boiling monomers or a mixture of the high boiling monomers to which this invention is directed.

The present invention has accomplished reduction in residual monomer content in bulk polymerized polymers by the inclusion of a volatile, nonpolymerizable, and chemically inert solvent with the monomers before polymerization. In this specification "volatile" as it is used to describe the added solvents shall mean readily vaporizable at a relatively low temperature compared under the same conditions, to the boiling range of the monomers or degradation or depolymerization range of the polymeric product. The inclusion of the solvent has been found to reduce substantially the residual monomer found after heat and/or catalyst has been applied to the system. The effect of this invention is to reduce the amount of residual monomer although not necessarily facilitating its removal. The solvent is removed after polymerization using common commercially known techniques such as a vacuum-vented extrusion process. The polymer obtained with the reduced residual monomer content has significantly better physical properties than those of the polymer obtained using standard polymerization techniques.

Generally the present invention encompasses the inclusion of any solvent with the monomer system. However, the choice of the best solvent for the particular system depends upon factors such as (1) the solubility of the solvent in the monomer, (2) the solubility of the solvent in the polymer, (3) the compatibility of the polymer in the monomer and solvent system, (4) the polarity of the solvent as compared to the polarity of the monomer system, (5) the ability of the solvent to reduce the glass temperature of the system in order to provide diffusion, (6) the boiling point of the solvent, (7) the reactive nature of the solvent in the particular system (8) the cost and availability of the solvent, and (9) the toxicity of the solvent and its vapors. The solvents that fit these characteristics under certain circumstances may be, but should not be limited to, the following: benzene, toluene, metaxylene, ortho-xylene, para-xylene, ethylbenzene, cyclohexane, n-hexane, n-octane, isooctane, ethanol, n-propanol, isopropanol, n-butanol, cyclohexanol, 2-methyl-1-butanol, 3-methyl-1-butanol, cyclohexanone, isobutyl acetate, ethyl acetate, tetrachloroethane, butyronitrile, dimethyl sulfoxide, ethylene glycol monoethylether acetate, methyl isobutyl ketone, ethyl butyrate, butyl acetate, etc.

The following combinations of monomer systems and inert solvents are the most preferred combinations of the present invention: (1) monomer systems containing N-cyclohexylmethacrylamide and the solvents; n-butanol, cyclohexanol, butyronitrile, isobutyl acetate, dimethyl sulfoxide, 2-methyl-1-butanol, 3-methyl-1-butanol, ethyl acetate and combinations of any of the foregoing; (2) monomer systems containing isobornyl methacrylate and the solvents; n-butanol, toluene, xylene, ethyl butyrate, butyl acetate, isooctant and combinations of any of the foregoing; and (3) monomer systems containing N-phenylmethacrylamide and the solvents; cyclohexanone, tetrachloroethane and combinations thereof.

It has been found that the inclusion of only small quantities of solvent materially reduces the amount of residual monomer in the polymer. Since the solvent must be removed from the system before use, it is desirable to add no more than is necessary to reduce the residual monomer to a satisfactory level. It has been found that for most systems a useful range is 2% to 30% and the most useful range is 3% to 20%.

The reduction in the residual monomer content in the polymers of the present invention improves the physical properties and characteristics of the polymer, including impact strength, resistance to deformation at elevated temperatures under load, resistance to warping, resistance to crazing, as well as resistance to chemicals, ultraviolet light, and outdoor exposure. These are all achieved objects of this invention which flow from the reduction in the amount of residual monomer present after polymerization. Additionally, when the polymer product is extruded, the presence of solvent may facilitate the plasticating stage.

The polymers of this invention may be used as modifiers of other plastics to improve resistance to deformation at elevated temperatures as noted above. In addition to imparting higher service temperatures to the finished plastic, the polymers as prepared by this invention have been found to be effective viscosity improvers and processing aids. The effectiveness of the polymers as prepared by this invention may be demonstrated with polymers and copolymers based on poly(vinyl chloride), chlorinated poly (vinyl chloride), chlorinated polyethylene, etc. Useful poly(vinyl chlorides) include copolymers of vinyl chloride monomers and up to 20% by weight on the vinyl chloride of other monomers such as vinyl halides, vinyl acetate, vinylidene chloride, vinylidine halides, ethylene, propylene, allyl acetate, allylchloride, etc. Thus, as employed herein, the term "vinyl chloride polymer" is meant to include polyvinyl chloride and copolymers of vinyl chloride with other ethylenically unsaturated monomers.

Polymers as prepared by this invention are useful for their superior properties, in particular resistance to heat deformation at elevated temperatures. The polymers as prepared by this invention are also useful as modified by additives such as impact modifiers, plasticizers, stabilizers, processing aids, etc., for example as molding compounds.

To assist those skilled in the art to practice the present invention, the following modes of operation are suggested by way of illustration, parts and percentages being by weigh unless otherwise specifically noted.

PROCEDURE I

In order to demonstrate the type of situation wherein this invention is useful, the following mix is prepared:

|  | Parts |
|---|---|
| Methyl methacrylate monomer | 70 |
| N-cyclohexylmethacrylamide | 30 |
| n-Dodecyl mercaptan | 0.3 |
| Lauroyl peroxide | 0.015 |

The n-dodecyl mercaptan is added to control the molecular weight to facilitate subsequent extrusion and forming of the polymer. Alternative catalysts and regulators may be used for polymerization without substantially changing the effectiveness of the invention. These may include but are not limited to benzoyl peroxide, 2,2'-azo-bis-isobutyronitrile, tert.-butyl peracetate, n-, sec.-, and tert.-butyl mercaptan, 2-mercaptoethanol, etc. The mixture is poured into a cellophane bag and placed in a spark-free, circulating air oven for 24 hours at 60 to 70° C., two hours at 75° to 85° C., and six hours at 115° to 125° C.

Analysis of the polymer as it is removed from the oven indicates that 5% to 6% of the weight of the total polymer is unreacted residual N-cyclohexylmethacrylamide. The residual monomer content is determined by extraction with a suitable solvent and the concentration determined by ultraviolet measurement. Analysis also indicates that about 3.0% of the weight of the polymer is unreacted residual methyl methacrylate monomer. The remainder of the polymer is chopped or broken into small pieces and placed in an extruder which is heated to a temperature of 450° to 575° F. and equipped with a vent attached to a vacuum of 20 to 28 inches of mercury to remove volatiles from the polymer. After the polymer has been extruded, it is broken into small pieces again and fed into the extruder for the second time. This second pass through the extruder is not always necessary but is used here to demonstrate the futility of trying to remove the high boiling monomers by conventional means. Even after the double-pass through the extruder, analysis indicates there still remains 2.3 to 2.7% unreacted N-cyclohexylmethacrylamide monomer. The distortion temperature under a load of 264 p.s.i. (using ASTM procedure D–648–56) is only 105° to 115° C.

PROCEDURE II

Procedure I is repeated exactly except that ten parts of the following solvents are added to the mix to obtain the following approximate residual monomer and physical property results:

| Solvent | Percent residual monomer found after polymerization | | Percent residual monomer after extrusion | | Deformation temperature under load at 264 p.s.i. (° C.) |
|---|---|---|---|---|---|
| | N-cyclohexylmethacrylamide | Methyl methacrylate | N-cyclohexylmethacrylamide | Methyl methacrylate | |
| n-Butanol | 2.7 | 0.35 | 0.8 | 0.3 | 127–133 |
| p-Xylene | 5.7 | 1.1 | 1.9 | 0.3 | 119–125 |
| Cyclohexanol | 4.3 | 0.2 | | | |
| Tetrachloroethane | 5.8 | 1.0 | 1.6 | 0.3 | 123–128 |
| Butyronitrile | 2.4 | 0.3 | | | |
| Isobutyl acetate | 4.4 | | 1.4 | | |
| Dimethyl sulfoxide | 4.1 | 0.1 | 1.4 | | 122–127 |
| 2-methyl-1-butanol | 3.5 | 0.2 | | | |
| 3-methyl-1-butanol | 2.9 | 0.2 | | | |

Similar results may be obtained with monomer systems containing N-p-cyanophenylmethacrylamide, N-3,4-dichlorophenylmethacrylamide, N - norbornylmethacrylamide, N-(1-methylcyclohexyl)methacrylamide, etc.

PROCEDURE III

Procedure I is used except that the following mix is prepared for polymerization:

| | Parts |
|---|---|
| Methyl methacrylate | 60 |
| Isobornyl methacrylate | 10 |
| N-cyclohexylmethacrylamide | 30 |
| n-Butanol | 10 |

Analysis of the polymer indicates that about 2.8–3.1% N-cyclohexylmethacrylamide remains after the polymerization in the unreacted state and after two passes through the extruder is reduced to about 0.8%.

PROCEDURE IV

Mixtures of solvents are effective in reducing the residual monomer content. The following two mixes may be prepared.

First | Parts
---|---
Methyl methacrylate | 70
N-cyclohexylmethacrylamide | 30
Ethyl acetate | 5

After polymerization using Procedure I, analysis indicates that the residual N-cyclohexylmethacrylamide is reduced to about 4.6%.

Second: | Parts
---|---
Methyl methacrylate | 70
N-cyclohexylmethacrylamide | 30
Ethyl acetate | 5
n-Butanol | 10

Analysis after polymerization using Procedure I indicates that the residual N-cyclohexylmethacrylamide is reduced to about 0.7 to 1.1%.

PROCEDURE V

Procedure I is followed exactly, except that the monomer mix is as follows:

| | Parts |
|---|---|
| Methyl methacrylate | 70 |
| N-phenylmethacrylamide | 30 |

Analysis after polymerization indicates that about 3.5% of the weight of the polymer is unreacted N-phenylmethacrylamide.

The addition of the following quantities of solvents and using Procedure I reduces the approximate residual monomer level after polymerization as follows.

| Solvent added: | Residual N-phenylmethacrylamide (percent) |
|---|---|
| 5 parts cyclohexanone | 2.9 |
| 10 parts cyclohexanone | 0.9 |
| 5 parts tetrachloroethane | 0.5 |
| 10 parts tetrachloroethane | 0.3 |

PROCEDURE VI

The concentration of the higher boiling monomer may vary greatly but the necessity for the invention remains. Procedure I is used except that the monomer mix contains isobornyl methacrylate and methyl methacrylate in the concentrations shown in the table below. To one-half of each mix 10% toluene is added before polymerization. The approximate residual isobornyl methacrylate monomer present in the polymer after polymerization is given below both in the sample without solvent and in the sample where 10% toluene has been added.

| Parts of isobornyl methacrylate | Parts of methyl methacrylate | Residual isobornyl methacrylate after— | |
|---|---|---|---|
| | | Polymerization | Polymerization if 10% toluene is added |
| 100 | 0 | 5.5–6.5 | 2.5–3.5 |
| 60 | 40 | 3.0–4.0 | 0.7 |
| 50 | 50 | 3.0–4.0 | 0.5 |
| 40 | 60 | 2.6 | 0.35 |
| 30 | 70 | 1.9 | 0.2 |
| 20 | 80 | 1.0 | 0.2 |
| 10 | 90 | 0.4 | 0.1 |
| 5 | 95 | 0.15 | 0.1 |

The residual isobornyl methacrylate monomer content may be obtained by dissolving the polymer and measuring the residual monomer by gas chromatography.

PROCEDURE VII

The solvent concentration affects the amount of residual monomer remaining. Procedure I is used except that the monomer mix is as follows:

|  | Parts |
|---|---|
| Isobornyl methacrylate | 50 |
| Methyl methacrylate | 50 |

The toluene solvent is added before polymerization in the following quantities and yields the following approximate values:

PROCEDURE VIII

| Parts of toluene added | Percent residual isobornyl methacrylate found after— | |
|---|---|---|
|  | Polymerization | Extrusion |
| 0 | 3.0–4.0 | 1.8 |
| 3 | 1.3 | 1.0 |
| 5 | 1.0 | 0.7 |
| 10 | 0.5 | 0.45 |
| 15 | 0.3 | 0.2 |
| 25 | 0.4 | 0.25 |
| 50 | 0.3 | 0.2 |

Various solvents are more or less effective on the residual monomer content of isobornyl methacrylate. Procedure I is used except the monomer system used is 60 parts methyl methacrylate, 40 parts isobornyl methacrylate and 10 parts of the following solvents which are added to yield the approximate amount of residual monomer as follows.

| Solvent added: | Residual isobornyl methacrylate after polymerization |
|---|---|
| Xylene (isomer mixture) | 0.3 |
| Toluene | 0.35 |
| 2-methoxyethyl acetate | 0.4 |
| Methyl isobutyl ketone | 0.4 |
| Ethyl butyrate | 0.25 |
| Butyl acetate | 0.4 |
| Isooctane | 0.4 |

PROCEDURE IX

|  | Parts |
|---|---|
| Methyl methacrylate | 60 |
| Isobornyl methacrylate | 38 |
| Ethyl acrylate | 2 |
| Toluene | 10 |

After polymerization using Procedure I, analysis indicated that about 0.4% of the polymer was unreacted isobornyl methacrylate.

PROCEDURE X

Results similar to those cited above are obtained with the following monomers: N-phenylmethacrylamide, halogen and polyhalogen substituted N-phenylmethacrylamide, N-cyclohexylmethacrylamide, halogen and polyhalogen substituted N-cyclohexylmethacrylamide, fenchyl methacrylate, fenchyl acrylate, isofenchyl methacrylate, isofenchyl acrylate, bornyl methacrylate, bornyl acrylate, isobornyl methacrylate, isobornyl acrylate, norbornyl methacrylate, norbornyl acrylate, halogenated and polyhalogenated forms of the methacrylates and acrylates mentioned above, etc.

What is claimed is:

1. A process for polymerizing a monomer system having at least 10 percent of at least one monomer selected from the group consisting of bicyclic esters of acrylic acid and bicyclic esters of methacrylic acid comprising:
   (a) introducing the monomer system, a free radical initiator, about 2 to 30 weight percent, based on the total weight of the system, of a non-polymerizable, chemically inert, volatile solvent, said solvent being readily vaporizable at a relatively low temperature as compared to the boiling range of said monomers or the degradation or depolymerization range of the polymer produced by this process,
   (b) heating to effect essentially complete polymerization so as to form a solid polymerization product, and
   (c) removing the solvent, the resultant polymer product having essentially no unreacted monomer content and improved physical properties.

2. The process of claim 1 wherein the monomer system contains isobornyl methacrylate.

3. The process of claim 2 wherein said monomer system further includes a monomer selected from the group consisting of methyl methacrylate and styrene.

4. The process of claim 1 wherein the solvent is selected from the group consisting of n-butanol, toluene, xylene, 2-methoxyethyl acetate, methyl isobutyl ketone, ethyl butyrate, butyl acetate, isooctane and combinations thereof.

5. The process of claim 1 wherein the solvent is present in the amount of from 3 to 20 weight percent.

References Cited
UNITED STATES PATENTS

| 2,741,652 | 4/1956 | Miller | 260—89.7 |
| 2,749,331 | 6/1956 | Breslow | 260—89.7 |
| 3,222,429 | 12/1965 | Boyd et al. | 260—85.5 HC |
| 3,240,767 | 3/1966 | Caldwell et al. | 260—86.1 N |
| 3,400,108 | 9/1968 | Caldwell et al. | 260—89.7 |
| 3,410,837 | 11/1968 | Shibukawa | 260—85.5 S |
| 3,485,775 | 12/1969 | Cenci et al. | 260—86.1 |
| 2,939,852 | 6/1960 | Schmidle | 260—89.5 R |
| 3,252,950 | 5/1966 | Terenzi et al. | 260—89.5 A |
| 2,838,479 | 6/1958 | Biletch | 260—86.1 R |
| 3,243,416 | 3/1966 | Caldwell et al. | 260—86.1 R |
| 3,255,162 | 6/1966 | Beavers et al. | 260—86.1 R |
| 3,312,675 | 4/1967 | Caldwell et al. | 260—86.1 R |
| 3,485,775 | 12/1969 | Cenci et al. | 260—86.1 R |

HARRY WONG, Jr., Primary Examiner

U.S. Cl. X.R.

260—78.4 R, 80.73, 80.81, 86.1 R, 86.1 N, 86.7, 88.7 D, 88.7 F, 89.1, 89.5 R, 89.5 A, 89.7 R, 91.5, 93.5 R, 897 R, 897 B, 899, 901